Figure 1:
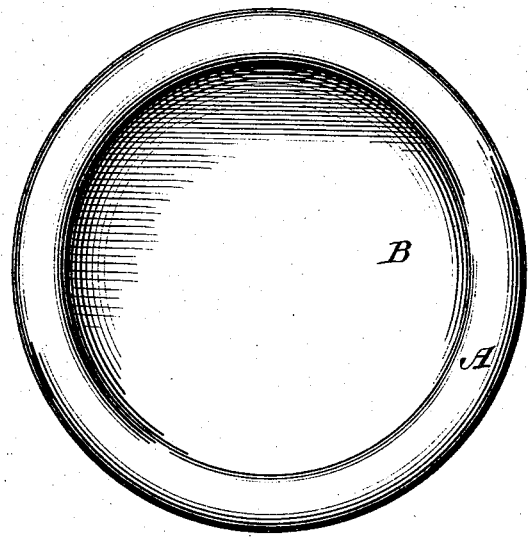

No. 785,116. PATENTED MAR. 21, 1905.
E. L. PERRY.
GASKET OR PACKING RING AND APRON THEREFOR.
APPLICATION FILED MAR. 11, 1904.

2 SHEETS—SHEET 1.

Witnesses
C. J. Williamson
M. E. Moore

Inventor
Edward L. Perry,
By Chas. H. Fowler
Attorney

No. 785,116. PATENTED MAR. 21, 1905.
E. L. PERRY.
GASKET OR PACKING RING AND APRON THEREFOR.
APPLICATION FILED MAR. 11, 1904.
2 SHEETS—SHEET 2.
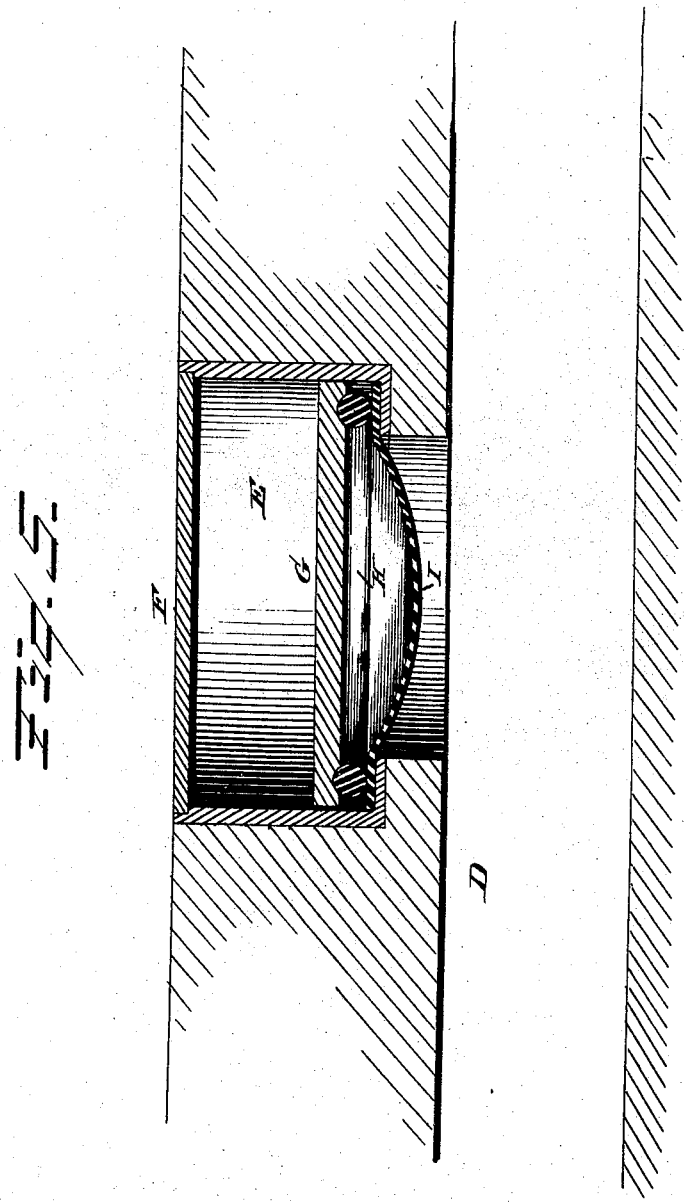
Witnesses
C. J. Williamson
M. E. Moore
Inventor
Edward L. Perry,
By Chas. H. Fowler
Attorney No. 785,116. Patented March 21, 1905.

UNITED STATES PATENT OFFICE.

EDWARD L. PERRY, OF PATERSON, NEW JERSEY.

GASKET OR PACKING-RING AND APRON THEREFOR.

SPECIFICATION forming part of Letters Patent No. 785,116, dated March 21, 1905.

Application filed March 11, 1904. Serial No. 197,703.

*To all whom it may concern:*

Be it known that I, EDWARD L. PERRY, a citizen of the United States, residing at Paterson, in the county of Passaic and State of New Jersey, have invented certain new and useful Improvements in Gaskets or Packing-Rings and Aprons Therefor; and I do hereby declare that the following is a full, clear, and exact description of the same, reference being had to the annexed drawings, making a part of this specification, and to the letters of reference marked thereon.

The present invention has for its object to provide a suitable gasket or packing-ring and an apron therefor to catch and retain the dropping from the condensation of moisture which collects above the gasket or packing-ring, such as in the manholes of electric conduits or in other similar places where it is essential to guard against the accumulated moisture from passing below the gasket or packing-ring.

Particularly in the manholes of electric conduits it is essential and important to protect the wires therein from contact with any dampness or moisture from the street-surface which would be detrimental to the successful working of such wires, and it is the purpose of the invention to provide against the danger of the wires coming in contact with the condensation of moisture in the manholes or other places where it is important to guard against the dropping from the condensation of moisture.

The invention therefore consists in a suitable gasket or packing-ring and an apron therefor substantially as shown in the drawings and hereinafter described.

Figure 2:
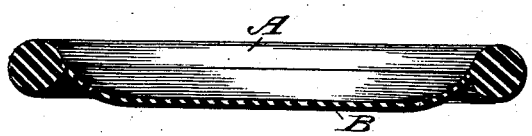
Figure 3:
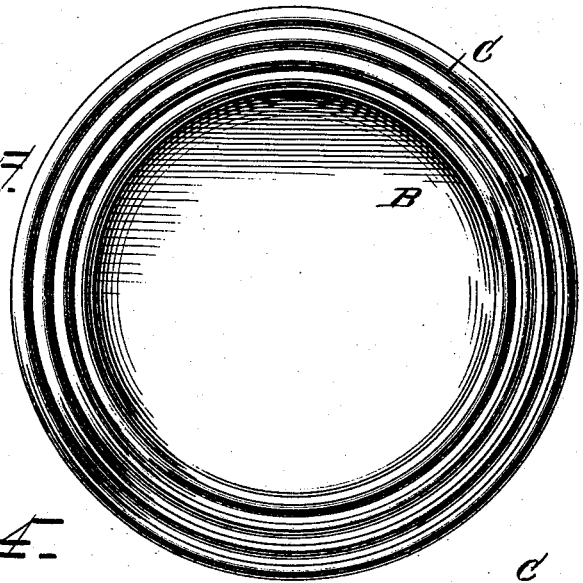
Figure 4:

Figure 1 of the drawings is a plan view of a gasket or packing-ring, showing the apron molded therewith; Fig. 2, a sectional elevation thereof; Fig. 3, a plan view of a modified form of gasket or packing-ring with the apron formed separate and afterward connected thereto; Fig. 4, a sectional elevation thereof. Fig. 5 is a sectional elevation of a portion of a conduit, showing the manhole, the manhole-plates, the gasket or packing-ring, and apron separate therefrom and placed under the gasket or packing-ring to retain the moisture from contact with the electric wires.

In the accompanying drawings, A represents the gasket or packing-ring of an elastic material, but preferably of rubber and of any desirable form and construction, according to the use to which it is to be applied.

In Figs. 1 and 2 I have shown an apron B molded with the gasket or packing-ring A, and in Figs. 3 and 4 the apron B is formed separate and afterward connected thereto by molding the gasket or packing-ring around the edge thereof. It is evident, however, that the apron may be of rubber or of any heat-insulating material and connected to the gasket or packing-ring in any suitable manner, the gasket or packing-ring C shown in Figs. 3 and 4 being a modified form over that shown in Figs. 1 and 2, the essential feature of the invention residing in a gasket or packing-ring of any elastic material and an apron therefor of a heat-insulating material, such as rubber, which completely incloses the opening to catch the condensation of moisture and prevent it from coming in contact with the electric wires when used in the manholes of conduits.

In Fig. 5 I have shown a conduit D for the electric wires having the usual manhole E and manhole-plates F G, the plate G resting upon the gasket or packing and the latter resting upon the apron, which in the present instance are shown as separate, the gasket or packing-ring H having its opening covered by the apron I, upon which the former rests, the same result being obtained as where the apron connects directly with the gasket or packing-ring. The apron will catch and retain the droppings from the condensation of moisture which collects upon the under side of the manhole-plate G and prevent it from dropping upon the electric wires, which would cause injury to the wires and necessitate labor and expense on repairs.

Having now fully described my invention, what I claim as new, and desire to secure by Letters Patent, is—

1. A gasket or packing-ring of elastic material and an apron of heat-insulating material to close the opening in said ring, substantially as and for the purpose set forth.

2. An elastic gasket or packing-ring and an apron closing the opening therein, said gasket or packing-ring and the apron therefor being molded together, substantially as and for the purpose specified.

3. An elastic gasket or packing-ring and an apron therefor, the ring being circumferentially corrugated and the apron extending across and within the opening in the ring and closing the same, the device as a whole being dish-shaped, as and for the purpose specified.

In testimony whereof I affix my signature in presence of two witnesses.

EDWARD L. PERRY.

Witnesses:
RAYTON E. HORTON,
ROSA STRAUMANN.